Figure 1:
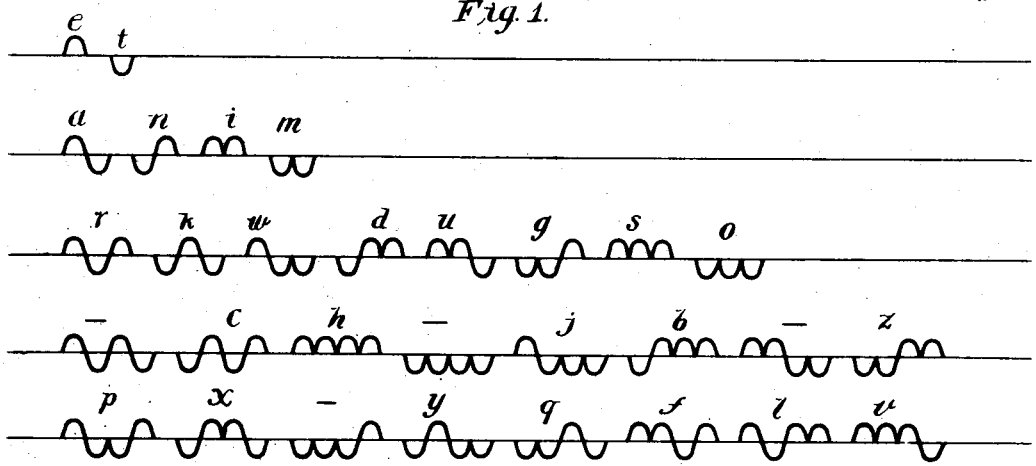

No. 711,941. Patented Oct. 28, 1902.
A. C. CREHORE & G. O. SQUIER.
SUBMARINE CABLE TELEGRAPH.
(Application filed Nov. 3, 1898.)
(No Model.) 3 Sheets—Sheet 1.

Witnesses:
C. L. Belcher
W. N. Capel

Inventors
Albert C. Crehore
George O. Squier
By
H. C. Townsend
Attorney

No. 711,941. Patented Oct. 28, 1902.
A. C. CREHORE & G. O. SQUIER.
SUBMARINE CABLE TELEGRAPH.
(Application filed Nov. 3, 1898.)
(No Model.) 3 Sheets—Sheet 2.

Witnesses:
C. L. Belcher
Wm. H. Capel

Inventors
Albert C. Crehore
George O. Squier
By
Attorney

No. 711,941. Patented Oct. 28, 1902.
A. C. CREHORE & G. O. SQUIER.
SUBMARINE CABLE TELEGRAPH.
(Application filed Nov. 3, 1898.)

(No Model.) 3 Sheets—Sheet 3.

Witnesses:
C. L. Belcher

Inventors
Albert C. Crehore
George O. Squier
By
Attorney of our invention relates also to apparatus

UNITED STATES PATENT OFFICE.

ALBERT C. CREHORE, OF HANOVER, NEW HAMPSHIRE, AND GEORGE O. SQUIER, OF THE UNITED STATES ARMY, ASSIGNORS TO THE CREHORE-SQUIER INTELLIGENCE TRANSMISSION COMPANY, OF CLEVELAND, OHIO, A CORPORATION OF OHIO.

SUBMARINE-CABLE TELEGRAPH.

SPECIFICATION forming part of Letters Patent No. 711,941, dated October 28, 1902.

Application filed November 3, 1898. Serial No. 695,350. (No model.)

*To all whom it may concern:*

Be it known that we, ALBERT C. CREHORE, a citizen of the United States, and a resident of Hanover, in the county of Grafton and State of New Hampshire, and GEORGE O. SQUIER, lieutenant-colonel United States Army, have invented certain new and useful Improvements in Submarine-Cable Telegraphs, of which the following is a specification.

The object of our invention is to increase the working capacity of submarine cables by diminishing the number of pulses which it is necessary to employ in transmitting a message.

To this end our invention relates mainly to the manner of distinguishing the various characters of any code from one another by a combination of the elements of time, polarity, and difference of electromotive force applied to the circuit, as hereinafter described and claimed.

Our invention relates also to apparatus suitable for practicing our invention, as more particularly hereinafter described and claimed.

In cable telegraphy the practice has heretofore been to impress upon the cable suitable pulses by an electromotive force sometimes positive and sometimes negative and at the desired times or intervals, acording to the code employed, positive pulses of one polarity being ordinarily used for the dashes of an alphabet or code and opposite pulses for the dots of the alphabet, the messages being read at the receiving end by the deflections or to-and-fro movement of an arm, stylus, or other device, either directly by observed movements thereof or else by causing said device to make a sinuous mark upon a recording strip or sheet. In this system the times or intervals at which the deflections occur and the direction of the deflections or movements of the instrument enable the characters of the code to be distinguished. The minimum number of pulses which it is necessary to employ in sending a message is then practically determined by the fact that the two elements only of time and polarity are employed. No attempt is made in this system to employ a difference in the magnitude of movement of the receiving instrument. Our invention aims to superimpose upon or compound with the other elements this difference in magnitude which may coexist with those of direction and interval of time and to thereby diminish the total number of pulses which it is necessary to employ in order to send all the characters of any code. This we accomplish by combining with the elements of time and polarity in transmitting pulses the further element of different electromotive forces impressed upon the cable coincidently with the transmission of said pulses.

Figure 2:
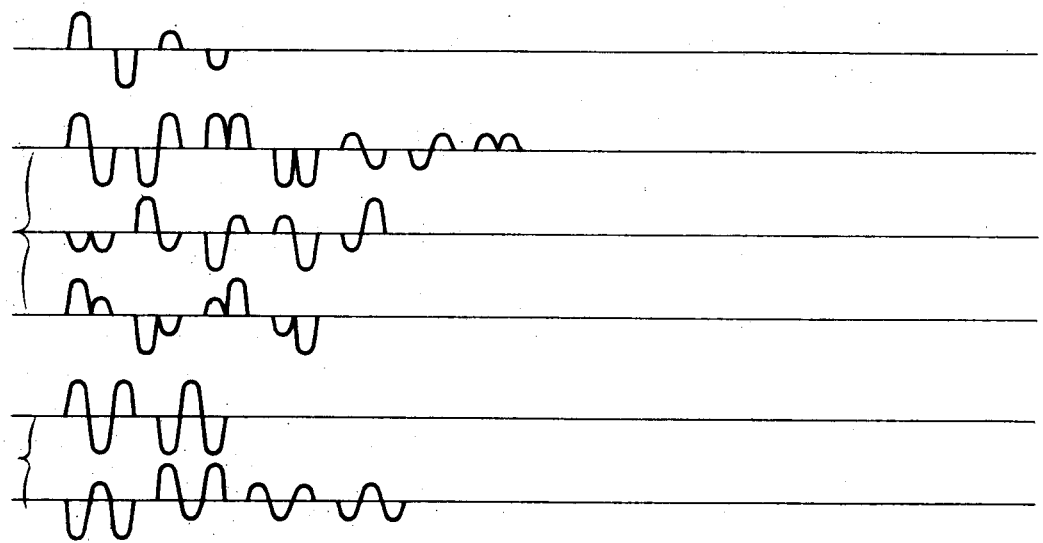
Figure 3:
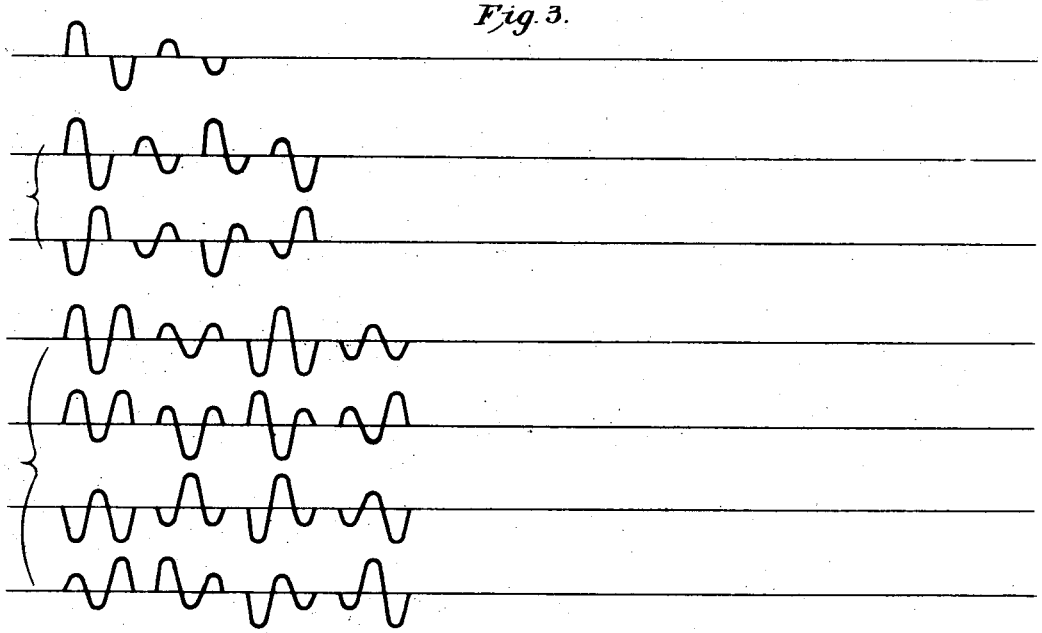

In the accompanying drawings, Figure 1 shows graphically the arrangement and polarity of pulses of electromotive force impressed in sending a message by the international code. Fig. 2 illustrates graphically a method of combining the elements of time and polarity with differences of electromotive force in impressing pulses upon the circuit according to our invention. Fig. 3 illustrates another form of our invention. Figs. 4, 5, 6, and 7 are representations in the nature of diagrams of the apparatus that may be used in practicing our invention.

In describing our invention we will assume that an instrument like the siphon-recorder is used as a receiver, inasmuch as that instrument furnishes a superior means of interpreting or receiving the current transmitted over the line. The siphon-recorder approximates, in fact, an accurate curve-tracer, and an accurate curve-tracer indicates the changes of current with the time and gives all the information which it is conceivable that the current contains. In land telegraphy the receivers ordinarily indicate whether the current is absent or present, and sometimes they indicate whether it is positive or negative. The element of time alone is used in ordinary Morse telegraphy, where the sounder indicates the presence or absence of current. The elements of time and polarity alone are used in the chemical-receiver, which gives a record in one place for a positive and in another for a negative current. This addition of polarity alone to that of time gives so much greater facility in interpretation that for the same number of waves or pulses per second on the two systems about three times as many words per minute may be received and transmitted. At present the siphon-recorder is used in cable telegraphy, making use of time and polarity alone. There is, however, a third element in the case of the curve-tracer or siphon-recorder which is not now employed, but which gives an increased facility in interpretation. This is the element of magnitude or amplitude of deflection of the recording-siphon as indicating whether the current-wave received is of one or another strength or value. A large additional gain in interpretation may be obtained by the triple combination of time, polarity, and two magnitudes only.

The value and nature of our system will be evident from a comparison between the present cable or international code, in which time and polarity alone are used, and a similar code to which our system is applied. It will be of course understood that in the diagrams, Figs. 1, 2, and 3, the sinuses or semiwaves shown indicate pulses of electromotive force impressed upon the circuit by any desired means and according to the code employed and that polarity of the impressed electromotive force is shown by the direction in which the sinus is developed or projects from the normal or horizontal line or zero. A difference in the height or amplitude of the wave or pulse indicates a difference in the value of the electromotive force used in producing the pulse.

Fig. 1 shows graphically the international code by the collocation and polarity of the elementary pulses of impressed electromotive force used for the various characters thereof, but with no difference in the value or strength of the electromotive force or potential.

In Figs. 2 and 3 the characters of a code are indicated by differences in the value or strength of the impressed electromotive force in addition to the time and polarity differences in accordance with our invention.

Examination of the conditions indicated in Fig. 1 shows that according to the law of combination and using four as the maximum number of pulses for any character there are thirty combinations using four or less pulses each. Twenty-six of these are used for the present alphabet and four are not needed. Twelve characters have four pulses, eight have three, and four have two, while two characters have one pulse each. With our new system, using the three elements of time, polarity, and electromotive force or magnitude difference, by the law of combinations eighty-four characters are possible; but as only twenty-six of these are required it is evident that an alphabet or code with twenty-six characters may be constructed to have, as indicated in Fig. 2, four characters with one pulse each, sixteen with two pulses, and six with three pulses.

In the alphabet shown in Fig. 3 the only characters which have pulses of the same polarity occurring in succession are eight of the combinations of two pulses per letter, since when three pulses are employed combinations sufficient in number to make up the alphabet and which will have their successive pulses alternating in polarity may be chosen from the sixty-four possible ones of three pulses each; but by varying the selection and increasing slightly the number of characters which have three pulses while somewhat diminishing the number which have two pulses only it is possible to have a code in which no two successive waves or pulses for any character shall be of the same polarity and at the same time to retain that characteristic of our invention which involves the combination, as already explained, of the three elements of time, polarity, and differences of electromotive force or impressed potential. The value of this will be readily appreciated from the following considerations:

When two successive waves of the same polarity are sent into a cable, the current does not return to the zero value, and as a consequence there is a piling-up effect which tends to displace the recording-siphon off toward the edge of the paper and make it harder to read because there is little distinction in the record between the successive pulses, they being both merged into one large one. The reason for this is clearly brought out when this fact is considered. If a continuous stream of pulses of the same polarity is sent into the cable in succession, the record shows a wavy line which starts from the center of the receiving-tape and oscillates about a medial line which is displaced quickly or at a sharp angle to one side, but gradually comes back to the center of the tape. After the record has returned to the center of the tape (the return being due to the presence of a condenser in the line) its appearance cannot be distinguished from the records produced by a simple sine-wave alternating-current. In fact the same record could be made in two ways, first as above, and, second, by using an alternating current of double the frequency of the above. The conclusion is that the use of pulses of the same polarity successively is equivalent in record to an alternating current of double the frequency, and that as the first signals to become illegible are those having two successive waves of the same polarity the use of characters produced by a succession of pulses of the same polarity is detrimental to speed, and that an alphabet having no successive waves of the same polarity is superior to one having them in legibility at the receiver. A much greater speed of transmission is therefore allowable before the limit is reached. Our improved system permits this advantage to be secured by selecting from the possible combinations those combinations only of three or less pulses in which the successive pulses alternate in polarity. Twenty-eight of these exist in the eighty-four combinations which it is possible to produce by using one to three pulses for each character varying in polarity as well as strength or amplitude of impressed electromotive force or potential. In other words, more than enough exists to make a complete alphabet, as we have indicated in Fig. 3. An evident relation exists between this last alphabet and the international alphabet.

In each of the cases, Figs. 2 and 3, it is obvious that the letters of the alphabet may be assigned to the various characters of the code according to the frequency with which the letters occur in transmission, so as to give to the letters most frequently used the least number of pulses.

The pulses may be impressed upon the circuit and the electromotive forces originated as to direction and power in any desired way. Our invention is not limited to any particular form of impressed electromotive force, pulse, or wave, although the graphic representations of our invention would indicate the existence of an electromotive force which gradually rises and falls, which is the form which we prefer to employ.

Figure 4:
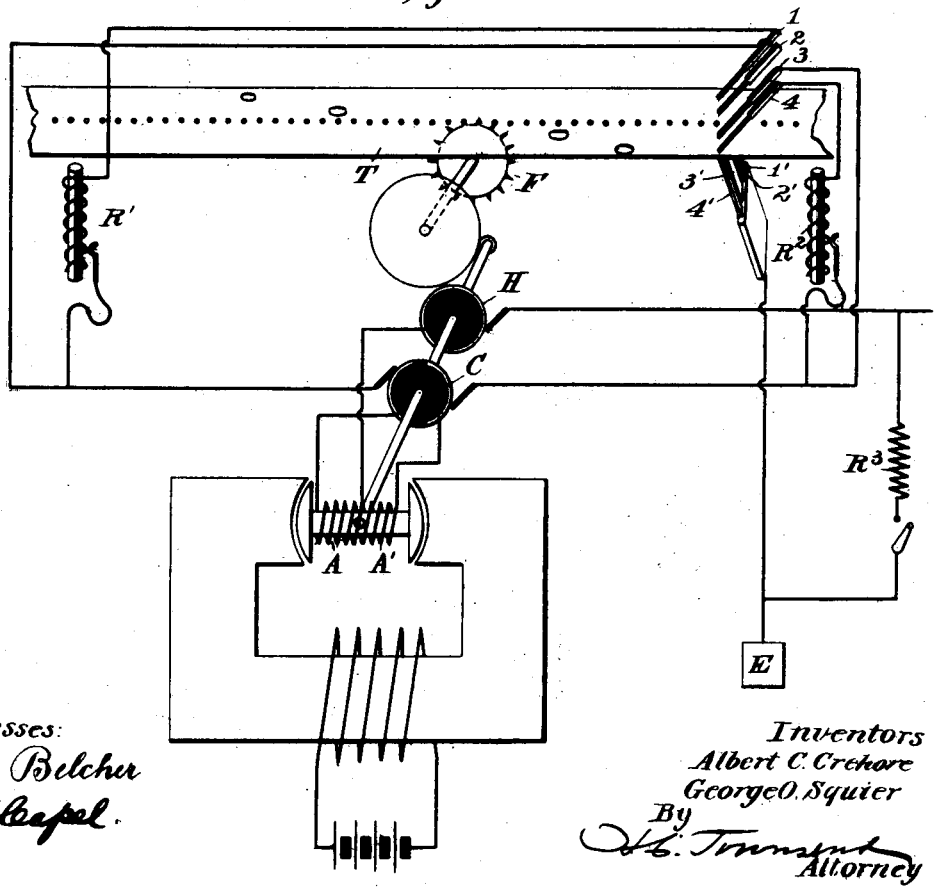

We show in Fig. 4, in diagrammatic fashion, apparatus that may be employed in practicing our invention, but do not wish to be understood as limiting ourselves to such apparatus nor to the character of the generator of electromotive force. It is preferable, however, to use a generator which will produce a sine-wave electromotive force which, as is well known, is developed from magneto or dynamo machines of any ordinary form. Two armature-coils of a dynamo or dynamos are indicated at A A′. Terminals of said coils connect through a pole-changer C to brushes or terminals 2 3 of a transmitter, and furnish thereat electromotive forces of opposite polarity. The opposite terminals of the coils connect through ring and brush H with the cable-circuit. These parts revolve in synchronism with the armature of the machine. Other brushes or terminals 1 4 of the transmitter may furnish electromotive force or potential of smaller value than 2 3 by being connected through adjustable impedances $R'$ $R^2$ with the circuits of the coils A A′, as indicated. A perforated transmitter-tape T moves under the brushes 1 2 3 4 in synchronism with the armature and is fed by any suitable feed-wheel F, gearing, as indicated, with the armature. The circuit is completed—as, for instance, to earth—through the paper-perforations by the tips of brushes 1 2 3 4 meeting the tips of a corresponding set of brushes 1′ 2′ 3′ 4′ beneath the paper. The paper has four parallel lines of perforations—two for pulses sent by impressing electromotive forces or potentials of one value, but of opposite sines, and two for other pulses of opposite sines, but sent by impressed electromotive force or potential of greater or less value than that sent by the first-named two. In practice the paper has a central row of perforations, with which teeth in the feed-wheel F engage. In operation only one brush is connected through the paper at a time.

The potential difference at the terminals connected to $R'$ $R^2$ may be anything desired different from the direct electromotive force furnished by the coils A′ directly to the other terminals and depend, of course, upon the value of the impedances.

Figure 5:
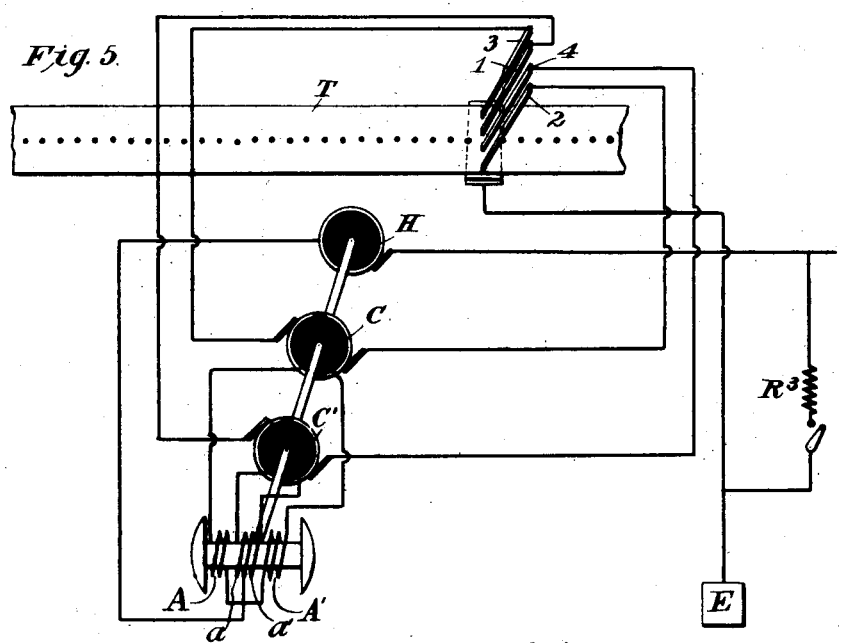
Figure 6:
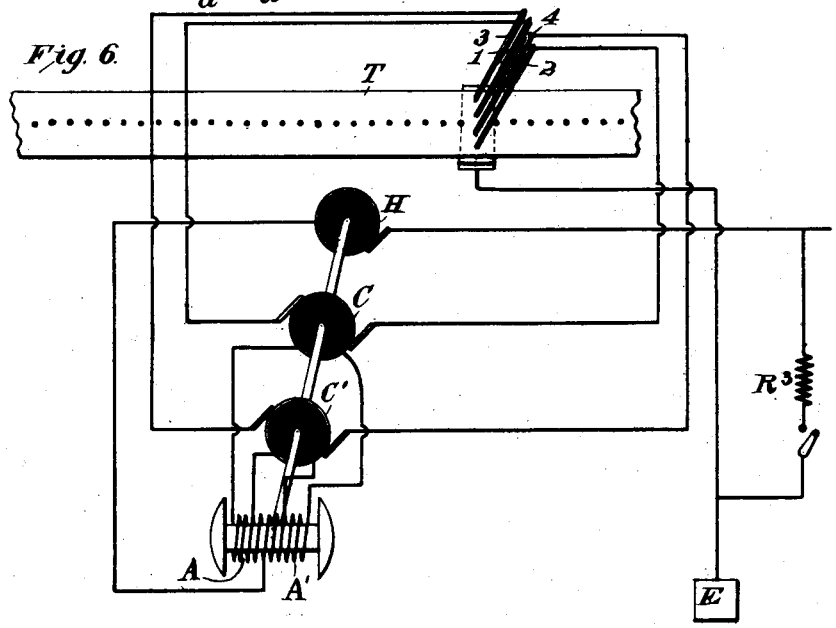

It is obvious that the different electromotive forces or potentials may be obtained without using impedances by simply employing additional armature-coils $a$ $a'$, Fig. 5, adapted to develop the required electromotive forces of greater or less value than those developed by coils A A′ or that these different electromotive forces when less are chosen may be had by tapping the coils A A′, as indicated in Fig. 6, the connections being taken through suitable supplemental pole-changer C′, as clearly shown. It is also obvious that the coils may revolve or operate in different magnetic fields and that there are very many other possible variations in the character of the generating devices, as well as in the arrangement or disposition of the generating-coils, when the generating device consists of a dynamo or magneto generating apparatus.

$R^3$ in Figs. 4, 5, and 6 typifies any adjustable or variable impedance or resistance forming a high-resistance shunt to earth after the manner sometimes employed in telegraphy.

Figure 7:
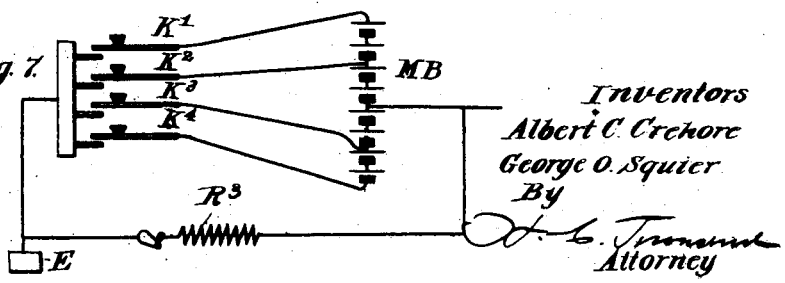

Fig. 7 shows diagrammatically how a battery might be employed as a generator and controlled by a series of keys to impress pulses of electromotive force on the line. Four keys manually operated are indicated at $K'$ $K^2$ $K^3$ $K^4$ and control the sections of a split battery M B, so that by manipulating the proper keys in succession the electromotive forces and polarities may be controlled and impressed upon the circuit in accordance with our invention in obvious manner.

It is obvious that the potentials or electromotive forces on brushes or terminals 1 4 or $K'$ $K^4$ need not be equal to one another and that this is also true of the two electromotive forces or potentials at brushes or terminals 2 3 or $K^2$ $K^3$. This variation is not indicated in the diagrams Figs. 2 and 3, as it obviously does not affect the general character of the invention.

The broad combination of an alternating-current generator and a synchronously-operating transmitter, such as hereinbefore described, adapted and adjusted to make and break the circuit at the natural zero of the alternating-current waves or pulses, as hereinbefore described, and the use therewith of any instrument, such as a siphon-recorder, which will make a record of the individual pulses are not claimed here, as they form the subject of our prior application, filed November 9, 1896, Serial No. 611,576.

We have also claimed in said application broadly the improvement in the art of automatic telegraphy which consists in impressing the characters of a code upon the alternating current by makes and breaks of the circuit adjusted to take place as herein set forth and to transmit or suppress determinate semicycles in definite order or succession in accordance with the code and making by the receiver a visual record showing each pulse transmitted or suppressed.

The improvement in submarine telegraphy which consists in transmitting the signaling waves or pulses by impressing upon the cable electromotive forces which change gradually and continuously from zero through a maximum to zero forms the subject of our prior application, filed October 25, 1898, Serial No. 694,509.

Our invention is mainly designed for use upon submarine cables; but we do not limit ourselves in all of our claims hereto appended to such use, since the combinations of apparatus which we herein claim may be employed upon land-lines and in other systems of telegraphy besides code telegraphy.

The invention claimed is—

1. In a telegraph, the combination with means for generating a series of electromotive forces which gradually rise and fall and differ in sine as well as in value, of a synchronously-operating transmitting apparatus adapted to impress upon the circuit for the several characters of the code, a succession of elementary generated pulses of electromotive force differing from one another as to potential and polarity for different characters in the manner set forth, so as to combine different values of electromotive force or potential with the elements of time and polarity to distinguish the characters of the code from one another.

2. In a submarine code-telegraph, the combination substantially as described with means for generating a series of electromotive forces which gradually rise and fall and differ in sine as well as in value, of a transmitting apparatus adapted to impress upon the circuit for the several characters of the code, a succession of elementary generated pulses of electromotive force differing from one another as to potential and polarity for different characters in the manner set forth, so as to combine different values of electromotive force or potential with the elements of time and polarity to distinguish the characters of the code from one another.

3. In a submarine code-telegraph, the combination substantially as described with, a generator of electromotive forces which gradually rise and fall and also differ in strength and sine, of a transmitting apparatus comprising means for impressing upon the circuit for the characters of the code, a succession of elementary pulses of electromotive force differing from one another as to potential and polarity for different characters in the manner set forth, so as to combine different values of electromotive force or potential with the elements of time and polarity to distinguish the characters of the code from one another.

4. In a telegraph, the combination with a dynamo-generator of sine-wave electromotive forces differing in value and polarity, of a synchronously-operating transmitting apparatus comprising means for impressing upon the circuit for the characters of a code, a succession of the said generated pulses differing from one another as to potential and polarity for different characters in the manner set forth, so as to combine different values of electromotive force or potential with the elements of time and polarity to distinguish the characters of the code from one another.

5. In a submarine code-telegraph, the combination with means for generating electric potentials differing in sine and amount, of a transmitting-tape adapted to control the generating apparatus in the manner described to transmit for each character of the code a succession of elementary signaling-pulses differing in electromotive force or potential as well as in polarity for different characters, successive pulsations in each character being of opposite polarity, thus combining time, polarity and electromotive force or potential to distinguish the characters of the code from one another in the manner set forth.

6. In a transmitting apparatus for telegraphy, the combination with an alternating-current generator, of a transmitting-tape running in synchronism therewith and having four rows of perforations, and four transmitting-styluses adapted to impress upon the circuit four different electromotive forces or potentials differing in sine and value as described, two being of one sine and two of an opposite sine.

7. In a transmitting apparatus for code-telegraphy, the combination, substantially as described, of means for generating a continuous and uniform series of pulses of electromotive force or potential differing in sine and amount, and a transmitting-tape having four rows of perforations and corresponding styluses adapted to impress successively upon the circuit single pulses of said electromotive forces or potentials differing in sine or amount or both as described to distinguish the characters of a code system from one another.

8. In a transmitting apparatus for code-telegraphy, the combination of means for generating or producing a continuous series of electromotive forces or potentials differing in sine and amount, as described, and transmitting or circuit-controlling devices for impressing successively upon the circuit single pulses of said series of electromotive forces or potentials differing in sine or amount or both to distinguish the characters of a code system from one another.

9. In a telegraph apparatus, the combination with means for generating electric potentials differing in sine and amount, of a transmitting apparatus adapted to control the application of said potentials to the line in the manner described, to transmit a succession of elementary signaling-pulses differing in electromotive force and potential as well as in polarity for different signals, the successive pulsations in each signal being of opposite polarity thus combining time, polarity and electromotive force or potential to distinguish the signals employed from one another.

10. In a telegraph apparatus, the combination of a generator of electromotive forces which gradually rise and fall and also differ in strength and sine, of a synchronously-operating transmitting apparatus controlling the application of said electromotive forces to the line and adapted as described to transmit for the several signals a succession of elementary signaling-pulses differing in electromotive force and potential, as well as in polarity for different signals, the successive pulsations in each signal being of opposite polarity, thus combining the different values of electromotive force or potential with the elements of time and polarity to distinguish the signals from one another.

Signed at New York, in the county of New York and State of New York, this 27th day of October, A. D. 1898.

ALBERT C. CREHORE.
   GEORGE O. SQUIER.

Witnesses:
 WM. H. CAPEL,
 C. L. BELCHER.